UNITED STATES PATENT OFFICE.

MICHAEL MATHES, OF JERSEY CITY, NEW JERSEY, ASSIGNOR TO HIMSELF AND GUSTAV STEUP, OF SAME PLACE.

FIRE-EXTINGUISHING COMPOUND.

SPECIFICATION forming part of Letters Patent No. 254,560, dated March 7, 1882.

Application filed December 22, 1881. (No specimens.)

*To all whom it may concern:*

Be it known that I, MICHAEL MATHES, of Jersey City, Hudson county, New Jersey, have invented a new and Improved Fire-Extinguishing Compound, of which the following specification is a full, clear and exact description.

This invention relates to a new fire-extinguishing compound. The composition is such that it forms a solid cake, which may be conveniently shipped and stored, and which will dissolve rapidly in water under ordinary temperature.

The compound is made as follows: For ten parts of compound take per weight two parts of soda, one part of alum, three-fourths part of borax, one-fourth part of potash. These ingredients are powdered and mixed, and then six parts of water-glass are added thereto in a liquid state.

The composition will soon turn into a solid stone-like substance. This substance may be readily shipped and stored away ready for use. When it is to be used it is mixed with water and will dissolve therein in a very short time. The water may be of any temperature. The proportion should be about one and a half pound to one gallon of water. When water thus saturated is thrown upon a fire it will extinguish the same readily, inasmuch as the compound will form a fire-proof deposit or film upon the objects upon which it is thrown. These objects will not be injured thereby, and the compound will come off readily after the fire is extinguished.

I do not claim to have invented a mixture of water and water-glass, nor of water and alum, potash, or soda and borax, both of which are described in English Patent No. 7,731 of 1838; but I do claim—

A fire-extinguishing compound made by the direct mixture of soda, alum, borax, and potash with liquid water-glass, in or about the proportions set forth, to form a solid cake, readily dissolvable in water, substantially as specified.

MICHAEL MATHES.

Witnesses:
GUST. STEUP,
F. V. BRIESEN.